C. H. GIFFORD.
Horse Hay-Fork.
No. 69,651.
Patented Oct. 8, 1867.
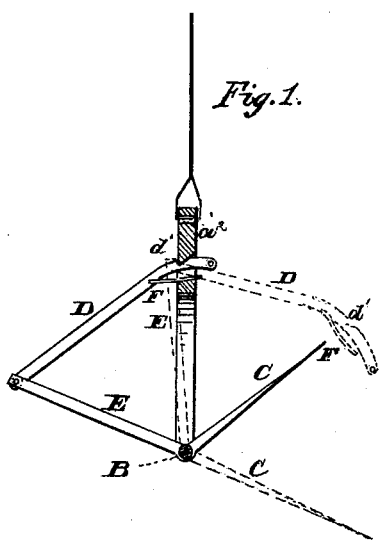
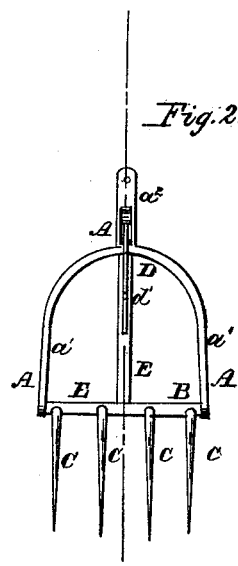

United States Patent Office.

C. H. GIFFORD, OF PHILADELPHIA, NEW YORK, ASSIGNOR TO HIMSELF AND ELBRIDGE SIMS, OF ANTWERP, NEW YORK.

Letters Patent No. 69,651, dated October 8, 1867.

IMPROVEMENT IN HORSE HAY-FORKS.

*The Schedule referred to in these Letters Patent and making part of the same.*

TO ALL WHOM IT MAY CONCERN:

Be it known that I, C. H. GIFFORD, of Philadelphia, in the county of Jefferson, and State of New York, have invented a new and improved Hay-Fork; and I do hereby declare that the following is a full, clear, and exact description thereof, which will enable others skilled in the art to make and use the same, reference being had to the accompanying drawings, forming part of this specification, in which—

Figure 1 is a vertical section of my improved hay-fork taken through the line $x\ x$, fig. 2.

Figure 2 is a front view of the same.

Similar letters of reference indicate like parts.

My invention has for its object to furnish an improved fork for loading or unloading hay, which shall be simple in construction, easily operated, strong, and durable; and it consists in the combination of the prongs, prong-shafts, rigid arm, catch-bar, spring, and frame with each other, as hereinafter more fully described.

A is the frame of the fork, the two lower arms $a^1$ of which are curved, as shown in fig. 2, and to their lower ends are pivoted the ends of the prong-shaft B. C are the prongs, which are securely and rigidly attached to the prong-shaft B. To the same prong-shaft B is rigidly and firmly attached the lower end of the arm E, to the upper end of which is pivoted the lower end of the catch-bar D, as shown in fig. 1. Upon the upper end of the catch-bar D is formed a notch or catch, $d'$, upon which catches the lower edge of the upper side of the slot in the arm or shank $a^2$ of the frame A, as shown in fig. 1, and holds the prongs C in proper position to support and hold the hay when loaded. F is a spring attached to the lower edge of the upper end of the catch-bar D, about opposite the notch $d'$ in said bar. This spring presses against the lower side of the slot in the arm $a^2$ of the frame A, and holds the fork set while raising and transporting the hay. The fork is tripped to discharge the hay by pulling down the upper end of the catch-bar D, so as to free the catch $d'$ from the arm $a^2$. The weight of the hay upon the prongs C immediately draws the parts of the fork into the position shown in red in fig. 1, discharging the hay. The fork may be tripped by means of a cord attached to the upper end of the said catch-bar D. The loaded fork is raised and transported by means of a rope attached to the upper end of the arm $a^2$ of the frame A, the other end of the said rope being attached to any suitable hoisting apparatus.

I claim as new, and desire to secure by Letters Patent—

An improved hay-fork, formed by the combination of the prongs C, prong-shaft B, rigid arm E, catch-bar D, pivoted to arm E, spring F, and frame A, with each other, substantially in the manner herein shown and described.

C. H. GIFFORD.

Witnesses:
GEO. E. TUCKER,
JOHN E. STRICKLAND.